R. P. BENNETT.
LOCK.
APPLICATION FILED SEPT. 9, 1911.

1,168,242.

Patented Jan. 11, 1916.
6 SHEETS—SHEET 1.

R. P. BENNETT.
LOCK.
APPLICATION FILED SEPT. 9, 1911.

1,168,242.

Patented Jan. 11, 1916.
6 SHEETS—SHEET 4.

R. P. BENNETT.
LOCK.
APPLICATION FILED SEPT. 9, 1911.

1,168,242.

Patented Jan. 11, 1916.
6 SHEETS—SHEET 6.

UNITED STATES PATENT OFFICE.

RICHARD P. BENNETT, OF CHICAGO, ILLINOIS.

LOCK.

1,168,242.  Specification of Letters Patent.  Patented Jan. 11, 1916.

Application filed September 9, 1911. Serial No. 648,562.

*To all whom it may concern:*

Be it known that I, RICHARD P. BENNETT, a resident of Chicago, in the county of Cook and State of Illinois, have invented certain new and useful Improvements in Locks, of which the following is a full, clear, and exact description.

The invention relates to locks, and more particularly to that type which is adapted to be controlled by a key.

The invention designs to provide an improved lock in which both longitudinal and rotary movement of controllers or disks are necessary, to unlock the locking bolt.

The invention also designs to provide improved means for preventing any but a properly formed key from being rotated to unlock or operate the lock controlling mechanism.

The invention also designs to provide improved means for securing the locking-bolt in its operative or locked position, and in such manner that it cannot be forced into unlocked position except by operation of key-controlled mechanism, this improved means comprising a latch disposed in the bolt-socket and which is controlled by a releasing bar slidably mounted in the bolt and operated by the key-controlled mechanism.

The invention also designs to provide an improved lock in which there is a supplemental bolt or lock mechanism which is adapted to be set so it may or may not be operated by the key-controlled mechanism.

A still further object of the invention, is to provide improved means, controlled by the key-lock, for controlling the operation of a securing bolt on the inside of a door.

Lastly, the invention designs to provide a lock which is efficient in operation and comparatively simple in construction.

In the drawings, Fig. 9 is a side elevation of the carrier and controllers therein, in locked position. Fig. 10 is a detail inner face view of the collar in which the front end and the carrier rotates, and which has grooves therein for controlling the key-engaged bolts in the carrier. Fig. 11 is a front view of the carrier, a key being shown in the section therein, the carrier being shown in its unlocked position. Fig. 12 is a view of the same in locked position. Fig. 12$^a$ is a detail of the key.

Figure 1:
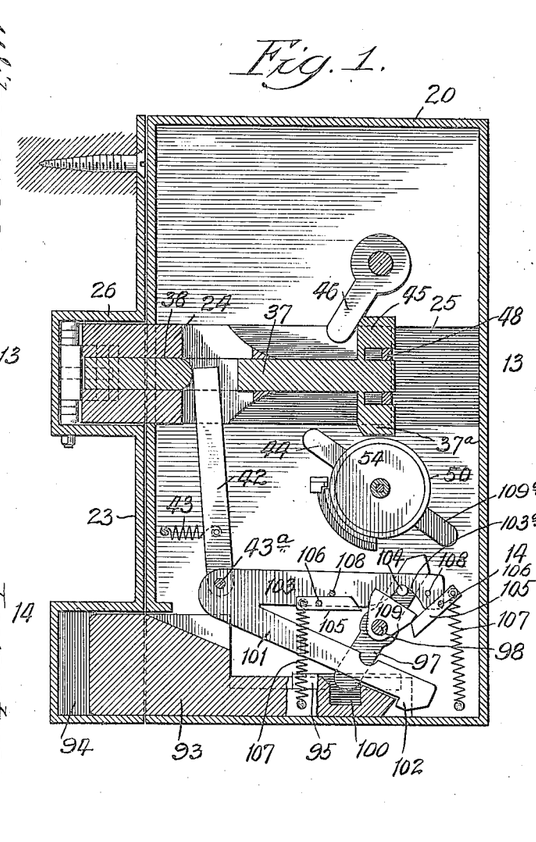
Figure 1 is a vertical section of a lock embodying the invention, the locking-bolts being shown in locked position.
Figure 2:
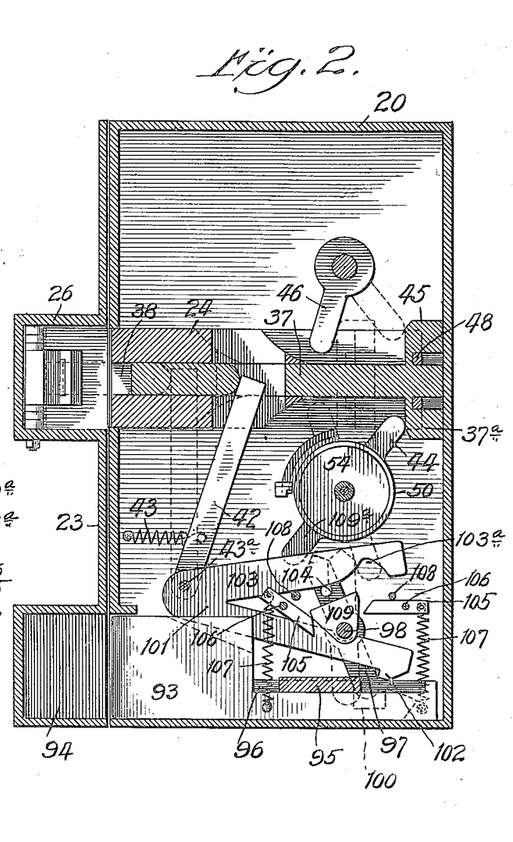
Fig. 2 is a view of the same, the bolts being shown in unlocked position.

The improved lock comprises a suitable case 20 usually set into a door 21, the inner side of the case consisting of a removable plate 22. A socket or bolt-receiving plate 23 is set into the door-casing or frame to which the door is to be locked. A locking-bolt 24 is slidably mounted in a suitable guideway 25 formed in case 20 and is adapted to be shifted into a socket 26 which is formed in plate 23 (Figs. 1 and 2). A stop 27 (Fig. 13) is formed on bolt 24 and is adapted to engage the edges of a pocket 28 in the case 20, to limit the throw of the bolt in either direction. The outer end of said bolt is beveled, as at 29, so that in closing the door when the bolt is in its locking position, it will be forced into the case, as well understood in the art, the bolt being spring-pressed into locking position, as hereinafter set forth. To better secure the bolt against being forced into unlocked position by means of a tool inserted between the door and the door-frame, a latch 30 is disposed in the door-frame, which is controlled by a slidable releasing-bar 37 in bolt 24, and is given an independent initial movement to release this latch. This latch 30 which is pivoted in an offset 31 of plate 23, by a pin 32 (see Figs. 1, 2 and 13) is normally held and pressed into the path of locking bolt 24 by a spring 23, and has a projecting lug 34 which is adapted to enter a correspondingly shaped recess 35 formed in one side of bolt 24. The outer end of this latch 30 is beveled as at 36 so that said bolt will shift it laterally when the bolt passes into socket 26, lug 34 being formed to engage bolt 24 so that the latter cannot be withdrawn until it has been released or moved out of recess 35 by a releasing-bar 37. The latter is slidably mounted in a channel 38 in bolt 24 and has an angular outer end 39 which is extended into position to engage a beveled edge 34$^a$ of lug 34 on latch 30, to swing the latch out of recess 35 in bolt 24 and to release said bolt, which is cut away, as at 40 to permit the angular end to slide in said bolt. Bar 37 is normally pressed toward the outer end of bolt 24, by an arm 42 which is pivoted in case 20 at 43$^a$, and has a spring 43 applied thereto, which yieldingly holds bar 37 in its outermost position in bolt 24, the outer end of said bolt being formed to limit the outward movement of said bar in said bolt. Said arm and spring serve also through the releasing-bar, to normally press the bolt into locking-position. The inner end of bar 37 is provided with a lug or abutment 37$^a$ which is adapted to be operated to withdraw the bolt from plate 23 by an arm 44 of a key-actuated locking-mechanism and with an abutment or lug 45 which is adapted to be operated by an arm 46 which is operable from the inside of the door, by a knob 47. This latch 30 and releasing-bar 37 thus exemplify a device in which a latch is provided in the door-frame for securing the bolt against being forced to its unlocked position by a tool inserted between the door and the frame, and in which a releasing-bar slidably mounted in the bolt, serves to initially release the latch when the bolt is to be thrown by a key-controlled device or otherwise.

Figure 13:
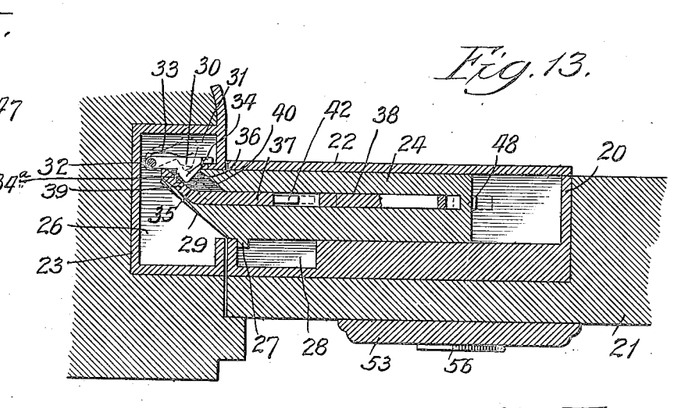
Fig. 13 is a horizontal section taken on line 13—13 of Fig. 1.
Figure 15:
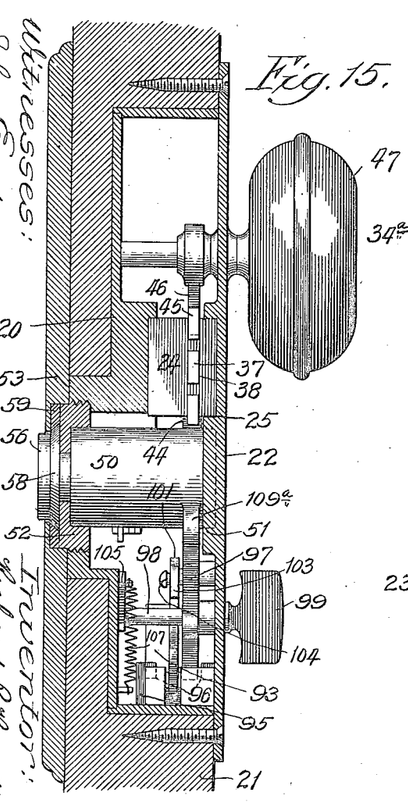
Fig. 15 is a section taken on line 15—15 of Fig. 1.

The operation of the mechanism thus far described will be as follows: Assuming the bolt to be in locked position as shown in Figs. 1 and 13, latch 30 will secure bolt 24 against withdrawal from socket 26. When either arm 46 or arm 44 is operated, by means hereinafter more fully set forth, it will first engage one of the abutments 37$^a$, 45 and impart limited initial independent movement to bar 37, causing the angular end 39 of said bar to disengage latch 30 from bolt 24 and thereafter, the rear portion of bar 37 will encounter the rear wall 48 of bolt 24 and cause bar 37 and bolt 24 to move in unison to withdraw the bolt from socket 26, as shown in Fig. 2. The improved key-controlled mechanism for operating arm 44 to withdraw bolt 24 comprises a rotatable cylindrical shell 50, which serves as a carrier for the controllers 69, 70, 71, 72 and 73 and is mounted at its rear, in a bearing 51 formed in plate 22, and at its front, in a bearing-collar 52 which is screw-threaded into the front wall of case 20 and extends into a recess formed in an outer face-plate 53 which is secured to the outside of the door (see Figs. 3 and 15). A wall 54 is fixed in the back end of carrier 50 and a wall 55 is fixed in the front end of the carrier. A rotatable key-plate 56 is journaled in collar 52 and has a slot 57 extending therethrough, which is formed to receive a key of the proper form. This key-plate 56 is held in the front plate 53, and against the front wall 55 of carrier 50 by a beveled flange 58 which fits in a correspondingly beveled ring or washer 59 which is held in a socket in plate 53, and between said plate and the front face of collar 52. Carrier 50 is normally locked against rotation by a pair of oppositely disposed bolts 60 which are mounted to slide in radial direction in the front wall 55 of the carrier and are normally pressed toward the center of the carrier by springs 61, respectively, so that the inner pointed ends 62 project into the key-slot 57$^a$ which extends through said wall. Each bolt 60 is provided with a projecting stud or lug 63 which extends through a radial groove 64 in the front wall 55 (Figs. 3, 4, 10, 11, and 12) and into a groove in the back face of collar 52 which is formed to prevent this stud from being rotated except when a key of the correct form or shape has been inserted into the slot 57 and the carrier. Each of these grooves in collar 52 comprises a radial portion 65 and a connecting arcuate portion 66 (see Fig. 10). When the carrier is in locked position, studs 63 extend into radial grooves 65 respectively and thus lock the carrier against rotation. When a key 67 is inserted it will engage the inner ends 62 of bolts 60 to shift studs 63 on said bolts, outwardly into registry with arcuate grooves 66 and then the carrier, will be free to be rotated, under control of the other key-controlled device. These key-operated bolts 60 and the grooves in collar 52, exemplify supplemental key-operated locking-means for preventing the rotatable carrier from being operated to shift the locking-bolt 24. In the operation of this mechanism, bolts 60 (Fig. 3) extend normally into the key-slot 57$^a$ in wall 55 of the carrier and studs 63 on said bolts, extend into the radial grooves 65 of the grooves in collar 52 and therefore prevent rotation of the carrier. Key-slot 57$^a$ is of such shape that the carrier will be rotated when the key is turned. A key of any other thickness than the one which will shift and hold bolts 60 in position to bring studs 63 into registry with arcuate grooves 66, will not release the carrier. A key of the proper thickness will press bolts 60 outwardly against the force of springs 61 the correct distance to bring studs 63 into registry with arcuate grooves 66, and thus release the carrier for rotation.

Figure 4:
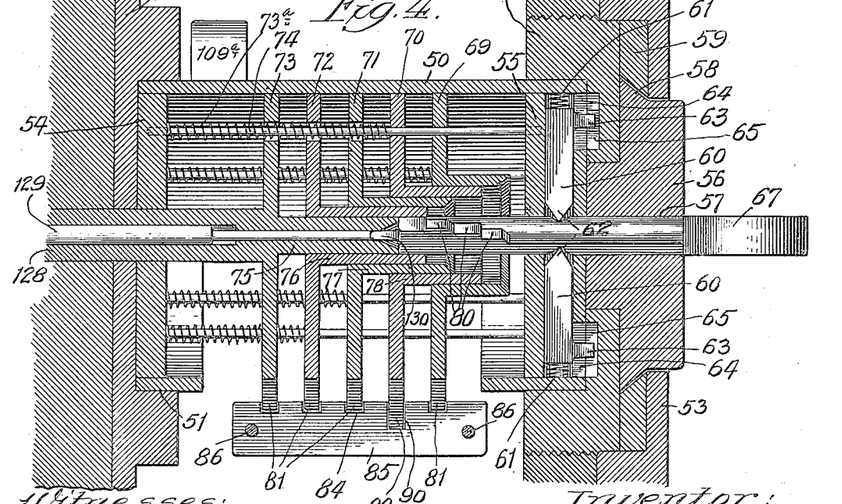
Fig. 4 is a view of the same, the parts being shown in position assumed when a key has been inserted.
Figure 5:
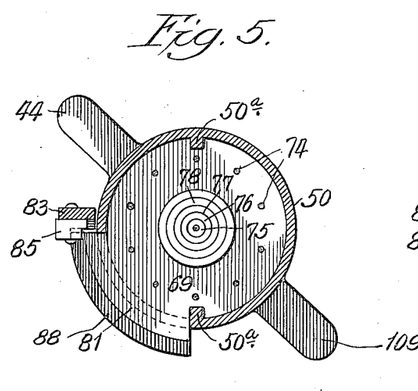
Fig. 5 is a section taken on line 5—5 of Fig. 3.
Figure 6:
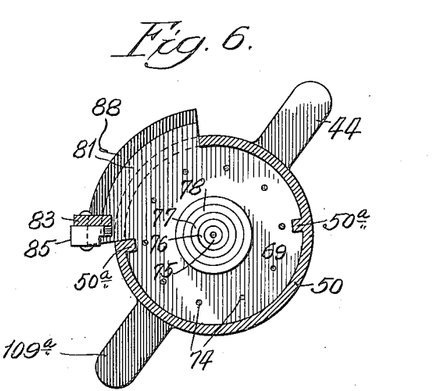
Fig. 6 is a section taken on line 6—6 of Fig. 4.
Figure 7:
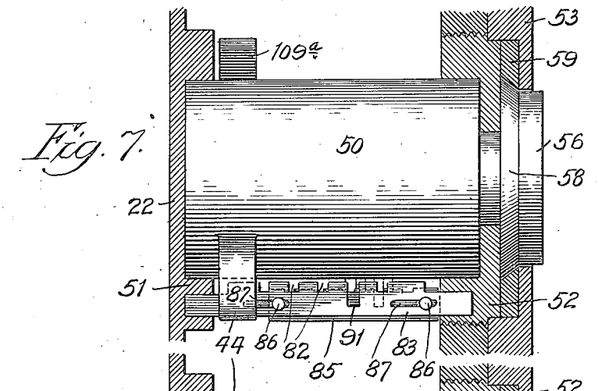
Fig. 7 is a plan of the rotatable carrier of the key-lock, being shown in locked position, the bearings in which the carrier is mounted being shown in the section.
Figures 9, 10, 11, 12, 12A:
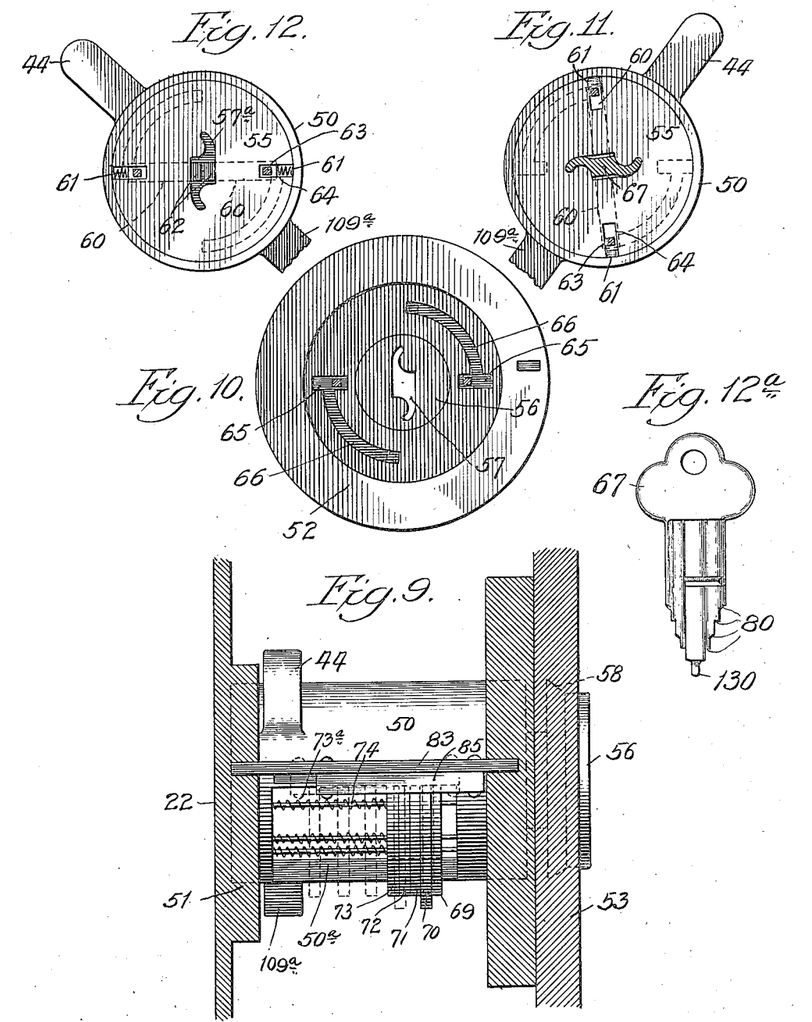

The improved key-operated controlling mechanism for the locking-bolt 24 comprises a series of controller-disks 69, 70, 71, 72, and 73, which are slidable longitudinally in and rotatable with carrier 50, being connected thereto by ribs 50ª fitting in notches in the disks. Each of these disks is normally pressed toward the front-wall 55 of the carrier by a pair of springs 73ª which are coiled around rods 74 respectively, which extend longitudinally through the carrier and are secured in the walls 54, 55 thereof. Rearmost disk 73 is formed with a forwardly projecting hollow spindle 75, disk 72 is provided with a forwardly projecting sleeve 76 fitting around spindle 75, disk 71 is provided with a sleeve 77 fitting around sleeve 76, disk 70 is formed with a sleeve 78 fitting around sleeve 77. Thus, each disk is spring pressed in forward direction and is provided with a projecting sleeve, and these projections are disposed different distances from the axis of the carrier and in the path of stepped lugs or abutments 80 on the key 67, respectively (Figs. 4 and 12ª). These disks are thus adapted to be shifted by the key in axial direction or longitudinally of the carrier whereby they will be separated from or shifted relatively to one another and shifted longitudinally to bring them into registry with notches in means which prevents the disks and carrier from being rotated until a key adapted to thus shift them, has been inserted. Each of the disks 69, 71, 72, and 73, is provided with a segmental projection 81, extending through a cut-away portion of the carrier, which, when the carrier is locked, is out of registry with notches 82 in a fixed locking-bar 83, which is disposed at one side of the carrier and also out of registry with notches 84 in a slidable locking-bar 85, which is slidably connected with bar 83 by studs 86 and slots 87 (See Fig. 7). Disk 70 is provided with a segmental projection 88 which extends into a notch 90 in the slidable locking-bar 85 and is adapted when disk 70 is shifted to the correct distance, by an abutment on key 67, to shift bar 85 so that its notches will be brought into registry with the notches 82 of the fixed bar 83. The fixed bar 83 is provided with a notch 91 through which projection 88 of disk 70 must pass when the slidable locking-bar has been shifted longitudinally to bring the notches of both locking-bars in alinement.

Figure 3:
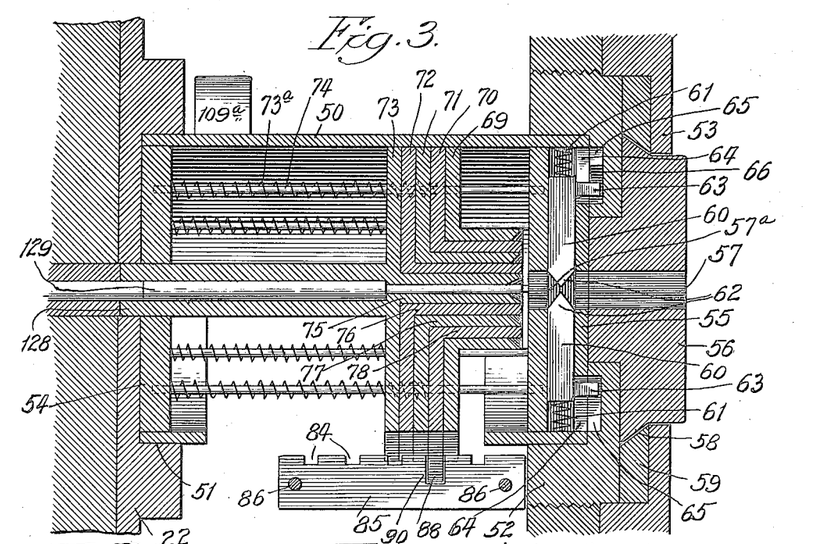
Fig. 3 is a central horizontal section through the key-operable lock-controlling mechanism, the parts being shown in position assumed when there is no key in the lock.
Figure 8:
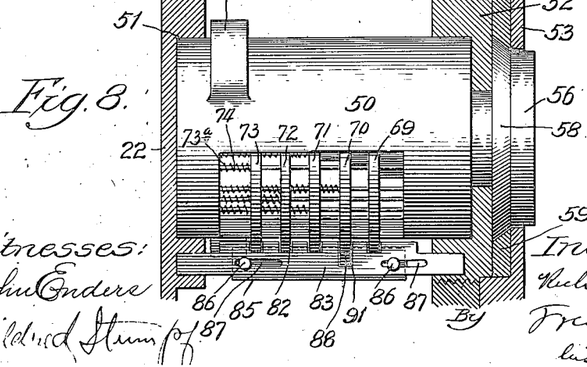
Fig. 8 is a similar view of the same in the unlocked position.

The operation of this key-controlled mechanism will be as follows: Normally, or when bolt 24 is in locking position, carrier 50 and the controller-disks therein, will be close together and in the position shown in Figs. 1, 3, 5, and 7, and projections 81 will be out of registry with the notches 84 in the slidable locking-bar 85 and out of registry with the notches 82 of the fixed locking-bar 83, and projection 88 on the disk 70 will be in notch 90 of bar 85 and out of registry with notch 91 of the fixed locking-bar 83. When the proper key is inserted through key-plate 50 the stepped abutments 80 of the key will engage the sleeves of the disks respectively and will shift the disks backwardly in the carrier and separate them or shift them relatively to one another, to the position shown in Figs. 7 and 8. Such shift will cause projection 88 of disk 70 to move the slidable locking-bar 85 backwardly to bring the notches 84 in the said plate into registry with the notches 81 in the fixed locking-bar and to also shift notch 90 for disk 70 into registry with notch 91 in the fixed locking-bar. Thereupon the path of rotation of the disks will be clear to permit the carrier and disks to be turned by key 67. Rotation of the carrier will cause its arm 44 to engage abutment 37ª of releasing-bar 37 to withdraw bolt 24 as hereinbefore described, and as shown in Fig. 2. Upon withdrawal of the key, springs 73ª will restore the disks into their normal position (Fig. 3). This mechanism thus exemplifies key-controlled and operated locking-mechanism in which there is a plurality of disks or controllers which must be shifted longitudinally the correct distance to bring them into a certain relative position with respect to the locking-bar, before they or the carrier can be rotated. This mechanism also exemplifies locking-mechanism in which one of the disks controls a slidable locking-bar which must be brought into correct relation with respect to the fixed locking-bar before the carrier can be rotated. Manifestly, no key will operate the lock to unlock the bolt 24 unless each of the disks is shifted longitudinally the correct distance and any variation in the shift of any of the disks or in their relative shift will prevent the rotation of the carrier or disks by the key.

Figure 14:
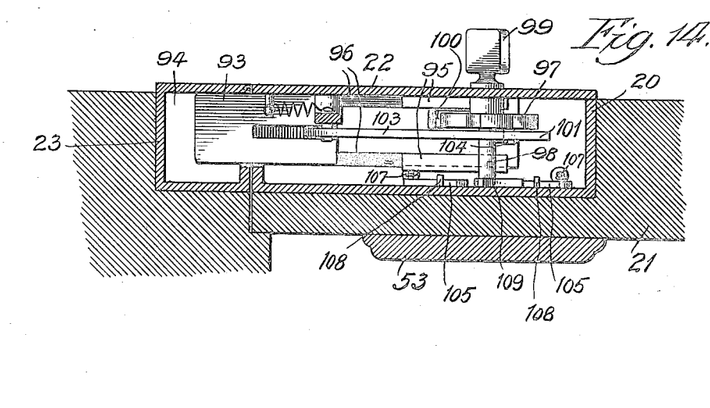
Fig. 14 is a horizontal section taken on line 14—14 of Fig. 1.

In some instances, it is desirable to provide a supplemental or auxiliary locking-bolt and mechanism which may be set so that the bolt may or may not be unlocked by the key-controlled carrier 50. For this purpose, a bolt 93 is slidably mounted in lock-case 20 and is adapted to enter a socket 94 formed in the frame-plate 23 (Figs. 1, 2, and 14). This bolt 93 is guided in the case by lugs 95 on one side of case 20 and plate 22 respectively, the lugs extending into ways or grooves 96 formed in the tail of the bolt.

This bolt is operable at will in either direction by a lever 97, which is secured to a shaft 98, which is operable by means of a knob or handle 99 which is disposed at the inside of the door. Lever 97 is adapted to enter a recess 100 in bolt 93. A latch 101 is adapted to lock the bolt in its operative position so that it cannot be retracted into case 20 by a tool or device inserted between the door and plate 23. This latch 101 has a hook 102 which is adapted to pass behind the tail of the bolt, as shown in Fig. 1 to prevent retraction of said bolt. Latch 101 is pivoted on pin 43ª and has an arm 103 which extends into position to be raised by a stud 104 on lever 97. When the bolt is in the locking position as shown in Fig. 1, operation of lever 97 will initially disengage latch 101 from bolt 93 to release the latter so that it will be free to be retracted by lever 97. Lever 97 is yieldingly held in operative relation to arm 103 of latch 101, by means of a pair of presser-devices disposed at opposite sides of the lever respectively. Each of the presser-devices comprises a dog 105 which is pivoted to the case 20 by a pin 106, and has one end connected to a spring 107. A fixed stop 108 is provided for each of the dogs 105 and the latter are adapted to engage the opposite sides of an arm 109 to normally hold lever 97 in its centralized position. When stud 104 of said lever is held in notch 103ª in latch-arm 103, as shown in Fig. 1, one of the dogs 105 will yieldingly hold said lever in engagement with bolt 93 and when said bolt is in retracted position, (Fig. 2) the other dog 105 will hold the lower end of said lever in engagement with the said bolt, it being understood that these springs 107 are not of sufficient force to operate bolt 93. This auxiliary bolt 93 and lever 97 are also operable by an arm 109ª on carrier 50, which is adapted to engage the upper end of lever 97. When bolts 24 and 93 are in locking position (Fig. 1) and lever 97 is shifted by arm 109ª, bolt 93 is retracted at the same time that bolt 24 is retracted, through the rotation of the key-controlled carrier 50, and is shifted into the position indicated in Fig. 2. In this manner, auxiliary bolt 93 may be unlocked by the key which controls bolt 24. When the parts are in position shown in full lines, (Fig. 2) reverse shift of carrier 50 and arm 109 by the key, will cause both locking bolts 24 and 93 to be simultaneously shifted into locking position. When it is desired to render lever 97 inoperative by the key-controlled locking-mechanism when bolt 93 is in unlocked position, knob 99 will be turned to move lever 97 into position, so that the end of the left-hand dog 105 will engage the flat end of arm 109 and cause the pressure of said dog 105 to be applied to hold lever 97 so that its upper end will be out of the path of arm 109ª of carrier 50 and bolt 93 will be inoperative by the key-controlled mechanism and operative only by knob 99. In like manner, the bolt 93 may be rendered inoperative by the key-controlled mechanism, when said bolt is in its locking-position, by turning knob 99 in the opposite direction, to cause the other dog 105 to engage the flat edge of arm 109. When lever 97 has been thus shifted, bolt 93 will remain in locked position and be inoperative by the key-controlled locking mechanism, said other dog engaging the outer edge of arm 109 to yieldingly hold said lever out of the path of arm 109ª. These spring-pressed dogs also shift lever 97 so its upper end will pass back into the path of arm 109ª after the arm passes beyond and when the arm is operated in either direction. This auxiliary bolt and operating and controlling mechanism, thus exemplify locking-mechanism in which a latch is provided for securing the auxiliary bolt against retraction and which may be set so that the bolt may or may not be operated by the key-controlling mechanism.

Figure 16:
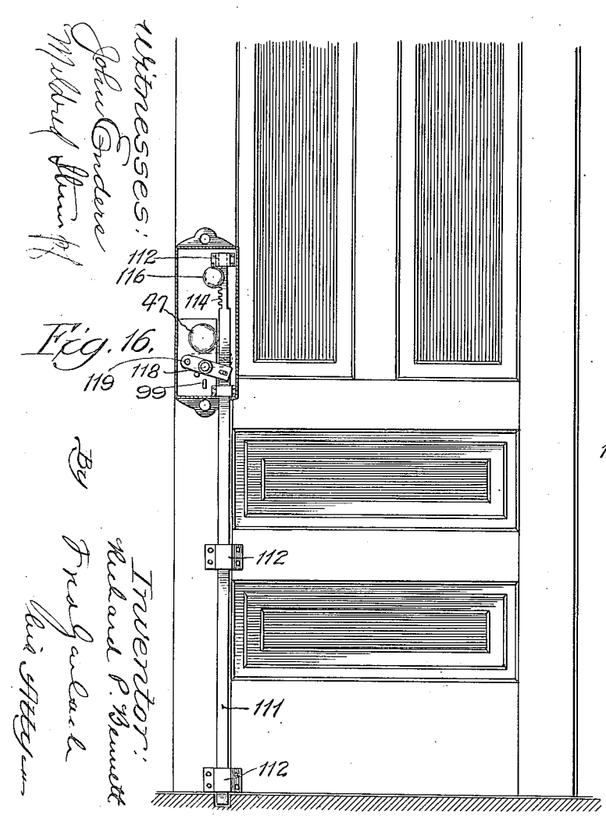
Fig. 16 is an inner side elevation of a door, and illustrating a bolt on its inner side which is controlled by the key-controlled lock.
Figures 17, 18:
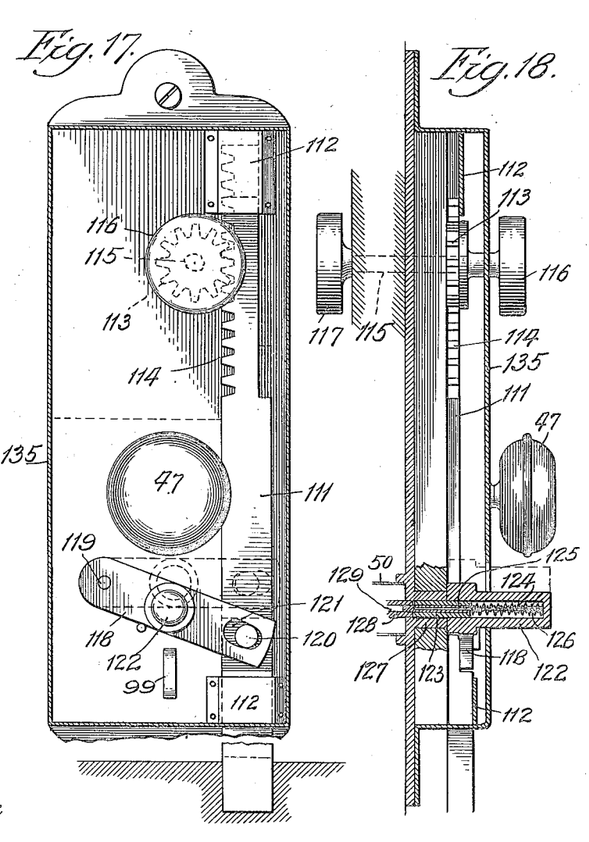
Fig. 17 is a detail of the operating mechanism for the bolt on the inside of the door.
Fig. 18 is a section taken from line 18—18 of Fig. 17.

In some instances, it is desirable to provide a manually shiftable bolt on the inside of the door which is controllable by the key-operated mechanism, such, for example, as a bolt 111 (Fig. 16) which is mounted to slide in guides 112 and may be raised or lowered by a pinion 113 which meshes with a rack 114, on said bolt. Shaft 115 of pinion 113 extends through the door 20 and has a handle 116 on the inside of the door and a knob 117 on the outside of the door so that it may be operated either from the inside or the outside of the door. The key-controlled mechanism for bolt 111 comprises an arm 118 which is pivoted to the door at 119 and is connected by a pin 120 and a slot 121 to bolt 111. This arm is provided with a socket 122, in which is slidably mounted a sleeve which is pressed normally outward by a spring 124, and plunger 125 is slidably mounted in said sleeve and pressed normally outward by a spring 126. When this sleeve 123 and plunger 125 are forced inwardly so their inner ends are alined with the inner face of arm 118, the arm and bolt 111 will be released for operation by knobs 116 and 117. When bolt 111 is in locking position, said sleeve and plunger may enter a socket 127 formed in plate 22. This sleeve and plunger are adapted to be shifted into position to release arm 118 by a sleeve 128 formed on the innermost disk 73, and a pin 129 which is slidably mounted in the said sleeve. Pin 129 has its front portion extending through sleeve 75 of disk 73 into position to be engaged by a point 130 on the key 67 and the sleeve 128 is shifted by disk 73. When the key is inserted into carrier 50, one of the steps 80 will push said disk inwardly and the point 130 of the key will push pin 129 inwardly and will slide it in sleeve 128 and bring the inner ends of sleeve 123 and plunger 125 into alinement with the inner face of arm 118, whereupon said arm will be released to permit bolt 111 to be operated. The upper end of bolt 111 and associated parts are inclosed in a case 135. This differential shift which is necessary to bring the sleeve 123 and pin 125 which are mounted in arm 118 into releasing position, makes it impossible to release bolt 111 by insertion of a wire tool into the key-slot, other than a suitably formed key and therefore this mechanism provides efficient key-controlled means for a locking-bolt on the inside of the door.

The invention thus provides locking mechanism by which a door may be effectively secured against unlocking by improper means. Slight variation in the steps on the key and a corresponding variation in the locking-plates makes it possible to provide different locks and makes it impossible to unlock the lock by a key which varies slightly from that for which the locking-bar is designed. The latches for securing the bolts in locking-position render the locks secure against being tampered with.

The invention is not to be understood as restricted to the details set forth, since these may be varied within the scope of the appended claims, without departing from the spirit and scope of the invention.

Having thus described the invention what I claim as new and desire to secure by Letters Patent is:

1. In a lock, the combination of a plurality of controllers mounted to slide in the direction of the axis of their rotation and rotatable and slidable by a key, a slidable locking bar having notches which permit the controllers to be rotated when the controllers are shifted by the key into alinement with the notches, means on one of the controllers for shifting said bar to bring its notches into position to release the controllers, when both the controllers and the bar have been shifted, a locking-bolt and bolt-shifting means operable by the rotation of the key.

2. In a lock, the combination of a plurality of controllers mounted to slide in the direction of the axis of their rotation and rotatable and slidable by a key, a plurality of locking devices, each provided with means for locking the controllers, one of said devices being movable relatively to the other, means for shifting one of the devices by a controller to shift said device into position to release the controllers when they and the movable device have been shifted, the locking bolt, and bolt shifting means operable by the rotation of the key.

3. In a lock, the combination of a case, a plurality of rotatable controllers mounted to slide in the direction of the axis about which they rotate and having means disposed at different distances from said axis and adapted to be engaged and shifted relatively to one another by stepped abutments on a key, a plurality of separate retracting springs for each of the controllers, means for holding the controllers against rotation except when they have been shifted into a certain relation, a locking-bolt and bolt-shifting means operable by a key.

4. In a lock, the combination of a case, a plurality of controllers mounted to slide in said case and relatively to one another in the direction of the axis about which they rotate, said controllers having sleeves slidable in one another and engageable by a key, a lock-bar for holding the controllers against rotation and having notches through which the controllers may rotate, and a locking-bolt operable when said controllers are positioned to pass into said notches.

5. In a lock, the combination of a case, a plurality of rotatable and slidable disks, longitudinally extending sleeves on the disks respectively slidable in one another, and engageable by stepping abutments on a key, means for holding the disks against rotation except when they have been shifted to a certain relative position, and a locking-bolt operable by the key when the controllers are rotated.

6. In a lock, the combination of a case, a plurality of rotatable controllers mounted to slide in the direction of the axis about which they rotate, a plurality of locking-devices for holding the controllers against rotation until they are shifted to a certain relative position by the key, each of the said devices having notches therein, to release the controllers, one of said devices being movable relatively to the other, and a locking bolt controlled by the rotation of the controllers.

7. In a lock, the combination of a case, a plurality of rotatable controllers mounted to slide in the direction of the axis about which they rotate, a plurality of locking-devices for holding the controllers against rotation until they are shifted into certain relative positions by a key, each of the said devices having notches therein for the controllers, and a locking-bolt controlled by the rotation of the controllers.

8. In a lock, the combination of a case, a plurality of rotatable controllers mounted to slide in the direction of the axis about which they rotate, a fixed locking device for the controllers, having notches therein, through which the controllers may rotate, a slidable locking device having notches therein for the controllers, means for shifting the slidable locking-device so that its notches will be in registry with the notches of the fixed device, and a locking-bolt controlled by rotation of the controllers.

9. In a lock, the combination of a case, a plurality of rotatable controllers mounted to slide in the direction of the axis about which they rotate, a fixed locking device for the controllers, having notches therein through which the controllers may rotate, a slidable locking device for the controllers, having notches therein, means on one of the controllers for shifting the slidable locking device so that its notches will pass into registry with the notches of said fixed device, and a locking-bolt operable by the rotation of the controllers.

10. In a lock, the combination of a rotatable carrier, a plurality of controllers mounted to slide in the direction of the axis of rotation of said carrier and rotatable with said carrier and shiftable by a key, a plurality of locking devices for holding said controllers against rotation except when they have been shifted to relatively predetermined positions, one of said devices being movable relatively to the other and shiftable by a controller, a locking-bolt, and a bolt-shifting means operable by the rotation of the key.

11. In a lock, the combination of a rotatable carrier, a plurality of controllers mounted to slide in the direction of the axis of rotation of said carrier and rotatable with said carrier and shiftable by a key, springs for sliding said controllers in one direction, a plurality of locking devices for holding said controllers against rotation except when they have been shifted to relatively predetermined positions, one of said devices being movable relatively to the other and shiftable by a controller, a bolt and bolt-shifting means operable by the rotation of the carrier.

12. In a lock, the combination of a rotatable carrier, a plurality of controllers mounted to slide in the direction of the axis of rotation of said carrier and rotatable with said carrier and shifted by a key, a movable bar having notches which permit the controllers to be rotated when they are shifted into alinement with the notches, said bar being movable by one of the controllers a bolt and bolt-shifting means operable by said carrier.

13. In a lock, the combination of a case, a carrier rotatably mounted in the case, a plurality of controllers slidable in the carrier in the direction of the axis about which the carrier rotates and having means disposed at different distances from said axis slidable in each other and adapted to be engaged by a key, both relatively to one another and in the carrier, said carrier being rotatable by the key, means for holding the controllers against rotation except when they have been shifted, and a locking-bolt controlled by said carrier.

14. In a lock, the combination of a case, a carrier rotatably mounted in the case, a plurality of controllers slidable in the carrier in the direction of the axis about which the carrier rotates and having means disposed at different distances from said axis slidable in each other and adapted to be engaged and shifted by a key, both relatively to one another and in the carrier, said carrier being rotatable by the key, springs for retracting the controllers against rotation except when they have been shifted and a locking bolt controlled by said carrier.

15. In a lock, the combination of a case, a carrier rotatably mounted in the case, a plurality of controllers slidable in the carrier in the direction of the axis about which the carrier rotates and having means disposed at different distances from said axis and adapted to be engaged and shifted by a key, both relatively to one another and in the carrier, said carrier being rotatable by the key, a locking-bar having notches normally out of alinement with said controllers and into which and through which the controllers are movable, and a locking-bolt controlled by said carrier.

16. In a lock, the combination of a case, a carrier rotatably mounted in said case, a plurality of controllers slidable in said case and relatively to one another in the direction of the axis about which the carrier rotates, said controllers having sleeves slidable in one another and engageable by a key, a locking-bar for holding the controllers against rotation and having notches through which the controllers may rotate, and a locking-bolt controlled by said carrier.

17. In a lock, the combination of a case, a cylindrical shell rotatably mounted in the case, disks mounted in said shell to slide therein and relatively to one another, longitudinal extending sleeves on the disks respectively slidable in one another and engageable by a key, means for holding the disks against rotation except when they have been shifted to certain relative positions, and a locking-bolt controlled by the shell.

18. In a lock, the combination of a case, a cylindrical shell rotatably mounted in the case, disks mounted to slide in said shell and relatively to one another, longitudinally extending sleeves on the disks respectively and engageable by a key, springs for retracting the disks, means for holding the disks against rotation except when they have been shifted to a certain relative position, and a locking-bolt operable by the shell.

19. In a lock, the combination of a case, a cylindrical shell rotatably mounted in the case, disks mounted to slide in said shell and relative to one another, longitudinal extending sleeves and projecting peripheral portions on the disks respectively, said sleeves being engageable by the key, a locking-bar for holding the disks against rotation, having notches through which the projections on the disks may rotate, and a locking-bolt operable by said shell.

20. In a lock, the combination of a case, a cylindrical shell having end walls, a plurality of disks mounted to slide in the shell and relatively to each other, rods mounted in the shell and extending through the disks, springs on the rods for retracting the disks respectively, means on the disks engageable by a stepped key to shift them in the direction of the axis about which the shell rotates, means for holding the disks against rotation, having notches therein through which the disks may rotate when shifted by the key, and a locking-bolt operable by the shell.

21. In a lock, the combination of a case, a carrier rotatably mounted in the case, controllers mounted to slide in the carrier in the direction of the axis about which the carrier rotates, a plurality of devices for holding the controllers against rotation until they are shifted to certain relative positions by a key, each of the said devices having notches therein, one of said devices being movable respectively to the other, and a locking-bolt operable by the carrier.

22. In a lock, the combination of a case, a carrier rotatably mounted in the case, controllers mounted to slide in the carrier in the direction of the axis about which the carrier rotates, a plurality of devices for holding the controllers against rotation until they are shifted to certain relative positions by a key, each of the said devices having notches therein, and a locking bolt operable by the carrier.

23. In a lock, the combination of a case, a carrier rotatably mounted in the case, controllers slidable in the carrier in the direction of the axis about which the carrier rotates, a fixed locking device having notches therein through which the controllers may rotate, a slidable locking device having notches therein for the disks, key-operated means for shifting the slidable locking-device so that its notches will be in registry with the notches of the fixed device, and a locking-bolt operable by said carrier.

24. In a lock, the combination of a case, a bolt movable in the case, means for shifting said bolt, means to which the bolt is to be secured, having a socket into which the bolt may be projected, a latch mounted in said means for engaging the bolt to secure it against retraction, and releasing-means for the latch operable by the bolt-shifting means.

25. In a lock, the combination of a case, a bolt slidably mounted in the case, means for shifting said bolt, an element in which the bolt is to be secured, having a socket into which the bolt may be projected, a latch mounted in said means, for engaging the bolt to secure it against retraction, and releasing-means for the latch, slidably mounted in the bolt and operable by the bolt-shifting means.

26. In a lock, the combination of a case, a bolt slidably mounted in the case, means for shifting said bolt, means in which the bolt is to be secured, having a socket into which the bolt may be projected, a pivoted spring-pressed latch mounted in said socket, for engaging the bolt to secure it against retraction, and releasing-means for the latch operable by the bolt-shifting means.

27. In a lock, the combination of a case, a bolt slidably mounted in the case, means for shifting said bolt, means in which the bolt is to be secured, having a socket into which the bolt may be projected, a pivoted spring-pressed latch mounted in said means, for engaging the bolt to secure it against retraction, and releasing means for the latch, slidably mounted in the bolt and operable by the bolt-shifting means.

28. In a lock, the combination of a case, a bolt slidably mounted in the case, means for shifting said bolt, means having a socket into which the bolt may be projected, a latch mounted in said socket, for engaging the bolt to secure it against retraction, releasing-means for the latch operable by the bolt-shifting means, and a spring for shifting the latch in one direction.

29. In a lock, the combination of a case, a bolt slidably mounted in the case, means for shifting said bolt, means having a socket into which the bolt may be projected, a latch mounted in said means, for engaging the bolt to secure it against retraction, releasing-means for the latch, slidably mounted in the bolt and operable by the bolt-shifting-means, and a spring for shifting the releasing-means in one direction.

30. In a lock, the combination of a case, a bolt slidably mounted in the case, means for shifting said bolt, means having a socket into which the bolt may be projected, a pivoted spring-pressed latch mounted in said means, for engaging the bolt to secure it against retraction, releasing-means for the latch, slidably mounted in the bolt and operable by the bolt-shifting means, and a spring for shifting the releasing-means in one direction.

31. In a lock, the combination of a case, a bolt slidably mounted in the case, key-controlled means for shifting said bolt, means having a socket into which the bolt may be projected, a latch mounted in said means, for engaging the bolt to secure it against retraction, and releasing-means for the latch operable by the bolt-shifting means.

32. In a lock, the combination of a case, key-controlled means for shifting said bolt, means having a socket into which the bolt may be projected, a latch mounted in said means, for engaging the bolt to secure it against retraction, and releasing means for the latch, slidably mounted in the bolt and operable by said bolt-shifting means.

33. In a lock, the combination of a case, a bolt slidably mounted in the case, key-controlled means for shifting said bolt, means having a socket into which the bolt may be projected, a pivoted spring-pressed latch mounted in said means, for engaging the bolt to secure it against retraction, and releasing-means for the latch operable by the bolt-shifting means.

34. In a lock, the combination of a case, a bolt slidably mounted in the case, key-controlled means for shifting said bolt, means having a socket into which the bolt may be projected, a latch mounted in said means, for engaging the bolt to secure it against retraction, releasing means for the latch operable by said bolt-shifting means, and a spring for shifting said releasing-means in one direction.

35. In a lock, the combination of a case, a rotatable carrier in the case, having an end-wall, key-operable controllers for the carrier, a bolt slidably mounted in said end-wall, the case being provided with a radial way or groove, means on the said bolt extending into said groove, and rotatable when the bolt has been shifted to a certain position by the key, and a locking bolt operable by the rotation of said carrier, said carrier having a key-slot into which the inner end of the bolt in the carrier normally extends.

36. In a lock, the combination of a case, a carrier rotatable in the case, having an end-wall, key-operable controllers in the carrier, means for holding the controllers against rotation until shifted by the key, a bolt slidably mounted in the end-wall and shiftable by the key, said case being provided with a radial and arcuate way or groove, means on the bolt extending into the groove and rotatable only when it is moved into position to enter the arcuate groove by the key, and a locking-bolt operable by the carrier.

37. In a lock, the combination of a case, a rotatable carrier in the case, having an end-wall, key-operable controllers for the carrier, a bolt slidably mounted in the said end-wall, the case comprising a collar adjacent said wall, having a radial way or groove therein, means on said bolt extending into said groove and rotatable only when the bolt has been shifted to a certain position by the key, and a locking-bolt operable by rotation of the carrier, said wall having a key-slot into which the inner end of the bolt in the carrier normally extends.

38. In a lock, the combination of a case, a carrier rotatable in the case, having an end-wall, key-operable controllers in the carrier, means for holding the controllers against rotation until shifted by the key, said case comprising a collar in which said carrier is journaled and disposed adjacent said end-wall, a bolt slidably mounted in said end-wall, said collar being provided with a radial and arcuate way or groove in one of the faces, means on said bolt extending into the groove or way and rotatable only when it is moved by the key into position to enter the arcuate portion of the groove, and a locking-bolt operable by the carrier.

39. In a lock, the combination of a plurality of rotatable controllers mounted to slide in the direction of the axis of their rotation, means for holding said controllers against rotation except when they have been shifted to a certain relative position by a key, a wall rotatable with said controllers and having a key-slot therein, a bolt slidably mounted in said wall, a case having a radial way or groove therein, means on said bolt extending into said groove and rotatable when the bolt has been shifted to a certain position by the key, and a locking-bolt controlled by the rotation of said controllers.

40. In a lock, the combination of a plurality of rotatable controllers mounted to slide in the direction of the axis of their rotation, means for holding said controllers against rotation except when they have been shifted to a certain position by a key, a wall rotatable with said controllers and having a key-slot therein, a bolt slidably mounted in said wall, a case having a radial and arcuate way or groove therein, means on said bolt extending into said groove and rotatable when the bolt has been shifted into position to enter the arcuate portion of the groove, and a locking-bolt controlled by the rotation of said controllers.

41. In a lock, the combination of a case, a plurality of locking bolts, key-controlled mechanism for operating said bolts, a latch for securing one of the bolts in locking position, releasing means for the latch, operable by said key-controlled mechanism, and means for rendering the last mentioned bolt inoperative by the key-controlled mechanism.

42. In a lock, the combination of a case, a plurality of locking-bolts, a key-controlled cylinder lock for operating said bolts, a latch for securing one of the bolts in locking-position, releasing-means for the latch, operable by said key-controlled mechanism, and means for rendering the latter bolt inoperative by said key-controlled mechanism.

43. In a lock, the combination of a case, a locking-bolt, key-controlled bolt-shifting mechanism, an auxiliary bolt operable by said key-controlled mechanism, independent means for operating said auxiliary bolt, means for rendering the latter bolt inoperative by the key-controlled mechanism, and a latch for securing the auxiliary bolt in locking-position, operable by the key-controlled means and the independent means.

44. In a lock, the combination of a plurality of locking-bolts, a spring for shifting one of the bolts in one direction, latches for securing the bolts in locking-position respectively, key-controlled shifting mechanism for said bolts, and releasing-means for both latches operable by said shifting-means.

45. In a lock, the combination of a plurality of locking-bolts, a spring for shifting one of the bolts into locking-position, latches for securing the bolts in locking-position respectively, key-controlled operating mechanism for said bolts, releasing-means for both latches operable by said operating-mechanism, and means for rendering one of the bolts inoperative by the key-controlled shifting mechanism.

46. In locking-mechanism, the combination of a locking-bolt, key-controlled operating mechanism for said bolt, comprising slidable and rotatable controllers, another bolt, means whereby the latter bolt may be operated, and controlling-means for the latter bolt, comprising a longitudinally movable element, operable by the key, which operates said controllers.

47. In locking-mechanism, the combination of a locking-bolt, key-controlled operating mechanism for said bolt, comprising a plurality of longitudinally movable elements, slidable one within the other and disposed to be shifted to release the latter bolt when a key is inserted to shift said controlling mechanism.

48. In locking-mechanism, the combination of a locking-bolt, key-controlled operating mechanism for said bolt, comprising slidable and rotatable controllers, another bolt, means whereby the latter bolt may be operated, and controlling-means for the latter bolt, comprising a plurality of relatively longitudinal movable elements, operable by the key which operates said controllers.

49. In locking-mechanism, the combination of a locking-bolt, key-controlled operating mechanism for said bolt, comprising slidable and rotatable controllers, another bolt, means whereby the latter bolt may be operated, and controlling-means for the latter bolt, comprising a plurality of relatively longitudinal movable elements, operable by the key which operates said controllers, one of said elements being secured to move with one of the controllers.

50. In locking-mechanism, the combination of a locking-bolt, key-controlled operating mechanism for said bolt, comprising slidable and rotatable controllers, another bolt, means whereby the latter bolt may be operated, and controlling-means for the latter bolt, comprising a plurality of relatively longitudinal movable slidably connected sleeves and spindles operable by the key which operates said controllers.

RICHARD P. BENNETT.

Witnesses:
  FRED GERLACH,
  AMY JEHLE.